US012783757B2

(12) United States Patent
Ogiso et al.

(10) Patent No.: US 12,783,757 B2
(45) Date of Patent: Nov. 3, 2026

(54) FLUID LEAKAGE DETECTION SYSTEM, FLUID LEAKAGE DETECTION DEVICE, AND LEARNING DEVICE

(71) Applicant: CHIYODA CORPORATION, Yokohama (JP)

(72) Inventors: Ryoji Ogiso, Yokohama (JP); Michiyo Kato, Yokohama (JP); Teruo Hioki, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 1209 days.

(21) Appl. No.: 17/231,646

(22) Filed: Apr. 15, 2021

(65) Prior Publication Data

US 2021/0232741 A1 Jul. 29, 2021

Related U.S. Application Data

(63) Continuation of application No. PCT/JP2019/030170, filed on Aug. 1, 2019.

(30) Foreign Application Priority Data

Oct. 16, 2018 (JP) ................................ 2018-195205

(51) Int. Cl.
*G01M 3/04* (2006.01)
*G01M 3/00* (2006.01)
(Continued)

(52) U.S. Cl.
CPC ............ *G06F 30/27* (2020.01); *G01M 3/002* (2013.01); *G01M 3/04* (2013.01); *G01M 3/26* (2013.01); *G01M 3/38* (2013.01); *G06F 2113/08* (2020.01)

(58) Field of Classification Search
CPC ...... G06F 30/27; G06F 30/20; G06F 2113/08; G06F 30/28; G01M 3/002; G01M 3/04;
(Continued)

(56) References Cited

U.S. PATENT DOCUMENTS

2006/0191323 A1* 8/2006 Garabedian ............... F17D 5/06 73/40
2007/0139183 A1* 6/2007 Kates .................. G08B 25/005 340/539.22
(Continued)

FOREIGN PATENT DOCUMENTS

JP H05231979 A 9/1993
JP 2000346796 A 12/2000
(Continued)

OTHER PUBLICATIONS

Abdel-Moati, H. M., et al. "Remote gas detection system using infrared camera technology and sophisticated gas plume detection computer algorithm." SPE Annual Technical Conference and Exhibition?. SPE, 2013. (Year: 2013).*
(Continued)

*Primary Examiner* — Michael Edward Cocchi
(74) *Attorney, Agent, or Firm* — CANTOR COLBURN LLP

(57) ABSTRACT

A fluid leakage detection system includes: multiple sensors, provided in a building such as a plant, that respectively detect values of detection target amounts at the installation positions of the sensors; and a fluid leakage detection device that detects leakage of a fluid in the building based on the values of detection target amounts detected by the multiple sensors. The fluid leakage detection device includes: an actual measured value acquirer that acquires the values of detection target amounts detected by the multiple sensors; and a leakage state judgement unit that judges a leakage state of the fluid in the building based on distributions of the
(Continued)

values of detection target amounts acquired by the actual measured value acquirer.

12 Claims, 7 Drawing Sheets

(51) Int. Cl.
*G01M 3/26* (2006.01)
*G01M 3/38* (2006.01)
*G06F 30/27* (2020.01)
*G06F 113/08* (2020.01)

(58) Field of Classification Search
CPC ............ G01M 3/26; G01M 3/38; G01M 3/00; G01M 3/02
See application file for complete search history.

(56) References Cited

U.S. PATENT DOCUMENTS

| | | | | |
|---|---|---|---|---|
| 2013/0096900 | A1* | 4/2013 | Usadi | G06F 30/20 703/10 |
| 2015/0308917 | A1 | 10/2015 | Soda | |
| 2016/0011072 | A1 | 1/2016 | Hale | |
| 2017/0307465 | A1 | 10/2017 | Yokono | |
| 2018/0181111 | A1* | 6/2018 | Cussonneau | G05B 23/024 |

FOREIGN PATENT DOCUMENTS

| | | | |
|---|---|---|---|
| JP | 2008547105 | A | 12/2008 |
| JP | 2016114500 | A | 6/2016 |
| JP | 2018077120 | A | 5/2018 |
| JP | 2018128318 | A | 8/2018 |

OTHER PUBLICATIONS

Zheng, Jianmin, et al. "Pipeline leak detection swimming robot design and deployment." 2018 Annual American Control Conference (ACC). IEEE, 2018. (Year: 2018).*
Liu, Aihua, et al. "Numerical simulation and experiment on the law of urban natural gas leakage and diffusion for different building layouts." Journal of Natural Gas Science and Engineering 54 (2018): 1-10. (Year: 2018).*
Singh, Harpreet. "Machine learning for surveillance of fluid leakage from reservoir using only injection rates and bottomhole pressures." Journal of Natural Gas Science and Engineering 69 (2019): 102933. (Year: 2019).*
Carreno-Alvarado, Elizabeth Pauline, et al. "A comparison of machine learning classifiers for leak detection and isolation in urban networks." Congress on Numerical Methods in Engineering CMN. 2017. (Year: 2017).*
AU Office action for corresponding Australian Application No. 2023202574; Issued on Mar. 22, 2024; 7 pages.
International Preliminary Report on Patentability for International Application No. PCT/JP2019/030170; Date of Mailing, Sep. 25, 2020.
International Search Report for Internation Application No. PCT/JP2019/030170; Date of Mailing, Sep. 17, 2019.
Written Opinion of the International Preliminary Examing Authority for International Application No. PCT/JP2019/030170; Date of Mailing, May 19, 2020.
Written Opinion of the International Searching Authority for International Application No. PCT/JP2019/030170; Dated, Sep. 17, 2019.
AU Examination report No. 1 for standard patent application for corresponding AU Application No. 2019362683; Mail Date of May 3, 2022.
JPO Notification of Reason(s) for Refusal for corresponding JP Application No. 2018-195205; mailed on Jul. 26, 2022.

* cited by examiner

FLUID LEAKAGE DETECTION SYSTEM, FLUID LEAKAGE DETECTION DEVICE, AND LEARNING DEVICE

CROSS REFERENCE TO PRIOR APPLICATIONS

This application is a continuation under 35 U.S.C. § 120 of PCT/JP2019/030170, filed Aug. 1, 2019, which is incorporated herein reference and which claimed priority to Japanese Application No. 2018-195205, filed Oct. 16, 2018 which is also incorporated herein reference. The present application likewise claims priority under 35 U.S.C. § 119 to Japanese Application No. 2018-195205, filed Oct. 16, 2018, the entire content of which is also incorporated herein by reference.

BACKGROUND OF THE INVENTION

1. Field of the Invention

The present invention relates to a fluid leakage detection system for detecting fluid leakage in buildings, and a fluid leakage detection device and a learning device that can be used in the fluid leakage detection system.

2. Description of the Related Art

If leakage of a flammable gas or a toxic gas occurs in a building, such as a plant, the leakage needs to be promptly detected and appropriately handled. As a technology for detecting a leaked gas, there has been proposed a technology of detecting a gas using an infrared camera or the like (see Patent Literature 1, for example).

Patent Document 1: Japanese Unexamined Patent Application Publication No. 2018-128318

SUMMARY OF THE INVENTION

With the leaked gas detection technology described in Patent Literature 1, it has been difficult to comprehend the gas leakage state or the position of the gas leakage source outside the shooting range of the infrared camera. Particularly, in offshore equipment, such as floating production storage and offloading (FPSO) equipment, the density of installed devices is high, and the behavior of leaked gas, which diffuses while interfering with devices, is complicated and less predictable. Also, there are made many invisible regions shadowed by devices, in which shooting by the infrared camera is impossible. Accordingly, specifying the leakage source in such equipment is further difficult. Also in such a building, a technology for enabling prompt detection and appropriate handling of fluid leakage is required.

The present invention has been made in view of such a situation, and a purpose thereof is to provide a technology that enables precise detection of fluid leakage states in buildings.

In response to the above issue, a fluid leakage detection system according to one aspect of the present invention includes: multiple sensors, provided in a building, that respectively detect values of detection target amounts at the installation positions thereof; and a fluid leakage detection device that detects leakage of a fluid in the building based on the values of detection target amounts detected by the multiple sensors. The fluid leakage detection device includes: an actual measured value acquirer that acquires the values of detection target amounts detected by the multiple sensors; and a leakage state judgement unit that judges a leakage state of the fluid in the building based on distributions of the values of detection target amounts acquired by the actual measured value acquirer.

Another aspect of the present invention is a fluid leakage detection device. The device includes: an actual measured value acquirer that acquires values of detection target amounts detected by multiple sensors, provided in a building, that respectively detect values of detection target amounts at the installation positions thereof; and a leakage state judgement unit that judges a leakage state of the fluid in the building based on distributions of the values of detection target amounts acquired by the actual measured value acquirer.

Yet another aspect of the present invention is a learning device. The device includes: a learning data acquirer that acquires, as learning data, values of detection target amounts detected, at the time of leakage of a fluid from a predetermined position of a building, respectively by multiple sensors provided in the building; and a learning unit that learns a leakage state judgement algorithm to which the values of detection target amounts detected by the multiple sensors are input and from which a position of a leakage source of the fluid is output, by machine learning using learning data acquired by the learning data acquirer.

Optional combinations of the aforementioned constituting elements, and implementation of the present invention in the form of methods, apparatuses, systems, recording media, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

Figure 1:
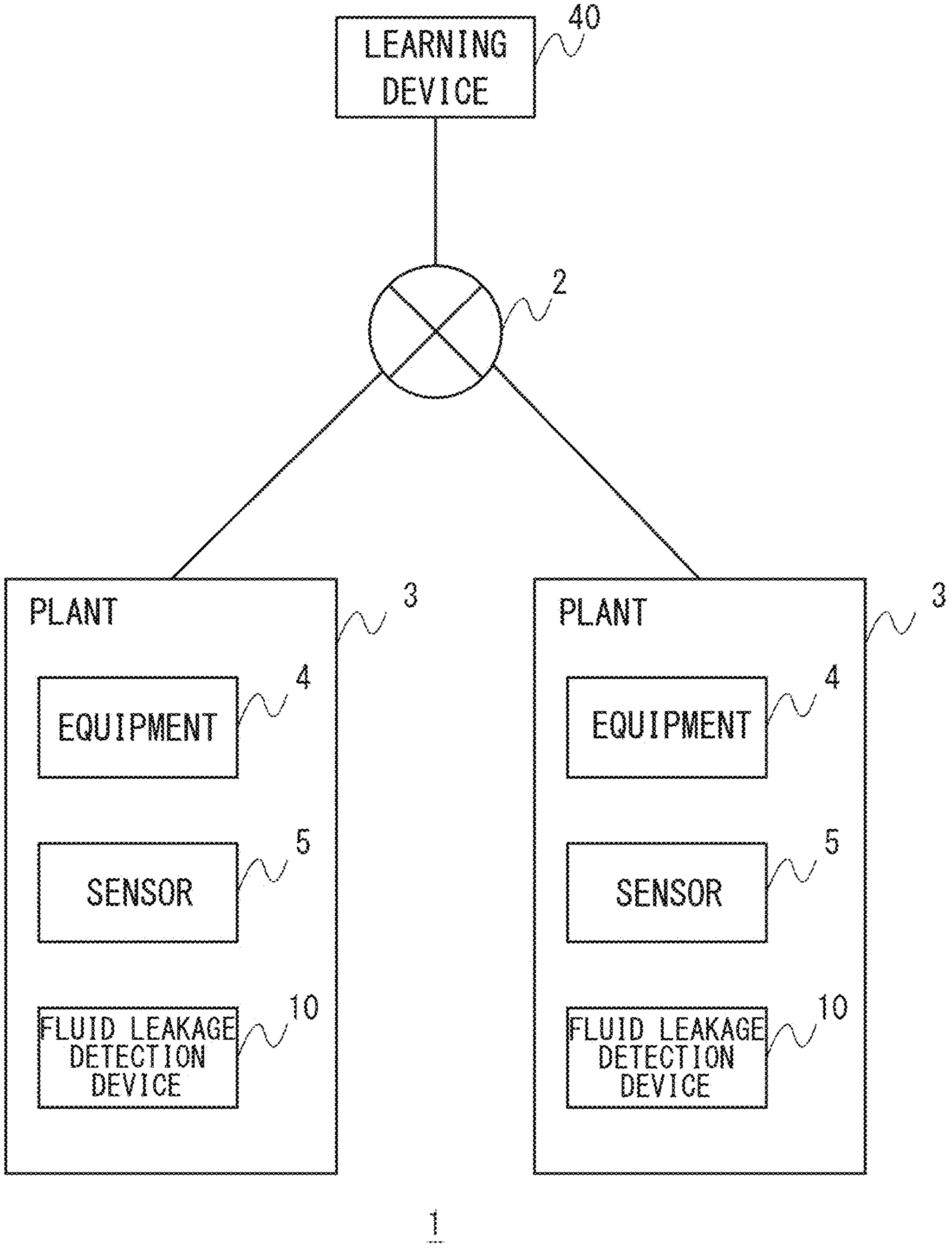
FIG. 1 is a diagram that illustrates an overall configuration of a fluid leakage detection system according to a first embodiment.

FIG. 1 illustrates an overall configuration of a fluid leakage detection system according to the first embodiment.

The present embodiment describes an example in which fluid leakage is detected in a building, such as a plant for producing liquefied natural gas, petroleum products, chemical products, or industrial products. A fluid leakage detection system 1 includes: multiple sensors 5 provided in a plant 3 to detect a fluid leaked from equipment 4, such as a device and a pipe, installed in the plant 3; a fluid leakage detection device 10 that detects a fluid leakage state in the plant 3 based on the detection results provided from the multiple sensors 5; and a learning device 40 that learns a fluid leakage state judgement algorithm used in the fluid leakage detection device 10 to judge a fluid leakage state. These components are connected via the Internet 2, which is an example of communication means. The communication means may be other arbitrary communication means, besides the Internet 2. The building may be an arbitrary aboveground building, offshore building, underground building, underwater building, architecture, construct, equipment, or the like, besides a plant.

Each sensor 5 detects a value of a detection target amount at the installation position thereof. A sensor 5 may detect, for example, the concentration, type, or composition of a fluid that may leak in the plant 3, a physical quantity, such as temperature or pressure, or light, such as infrared light, ultraviolet light, or visible light. Also, a sensor 5 may be a point detection type sensor that solely detects a detection target amount at the installation position, a line detection type sensor that includes a pair of a projector unit and an optical receiver unit and detects a detection target amount between the projector unit and the optical receiver unit, or a visible light camera or an infrared camera that captures a two-dimensional or three-dimensional image, for example. The present embodiment describes an example in which a gas concentration sensor, which detects the concentration of a gas, and an infrared camera are provided as the sensors 5.

Figure 2:
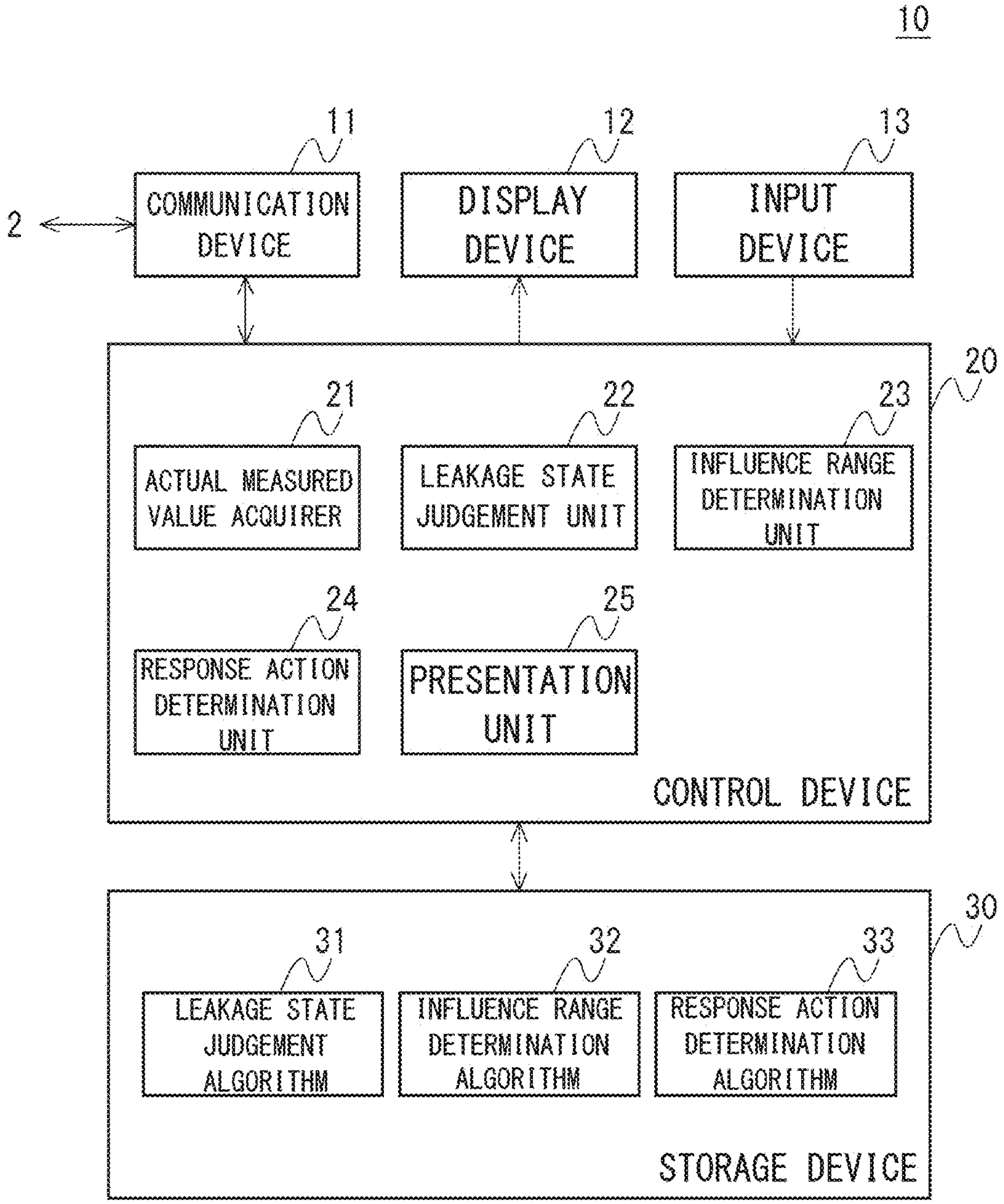
FIG. 2 is a diagram that illustrates a configuration of a fluid leakage detection device according to the first embodiment.

FIG. 2 illustrates a configuration of the fluid leakage detection device 10 according to the first embodiment. The fluid leakage detection device 10 includes a communication device 11, a display device 12, an input device 13, a control device 20, and a storage device 30.

The communication device 11 controls wireless or wired communication. The communication device 11 transmits or receives data to or from the sensors 5 and the learning device 40, for example, via the Internet 2. The display device 12 displays a display image generated by the control device 20. The input device 13 inputs an instruction to the control device 20.

The storage device 30 stores data and computer programs used by the control device 20. The storage device 30 includes a leakage state judgement algorithm 31, an influence range determination algorithm 32, and a response action determination algorithm 33.

The control device 20 includes an actual measured value acquirer 21, a leakage state judgement unit 22, an influence range determination unit 23, a response action determination unit 24, and a presentation unit 25. Each of these configurations may be implemented by a CPU or memory of any given computer, a memory-loaded program, or the like in terms of hardware components. In the present embodiment is shown a functional block configuration implemented by cooperation of such components. Therefore, it will be understood by those skilled in the art that these functional blocks may be implemented in a variety of forms by hardware only, software only, or a combination thereof.

The actual measured value acquirer 21 acquires values of detection target amounts detected by the multiple sensors 5. As described previously, the detection target amounts are the concentration of a certain type of gas detected by a gas concentration sensor, and the intensity of infrared light captured by an infrared camera, for example.

Based on distributions of the values of detection target amounts acquired by the actual measured value acquirer 21, the leakage state judgement unit 22 judges the leakage state, including the position of the gas leakage source in the plant 3, and the type, direction, and amount of the leaked gas. The leakage state judgement unit 22 may judge the leakage state using a statistical method based on the distributions of the detection target amounts detected by the multiple sensors 5. In the present embodiment, the leakage state is judged using the leakage state judgement algorithm 31 learned by the learning device 40. In the leakage state judgement algorithm 31, the values of detection target amounts detected by the multiple sensors 5 are input, and parameters representing the leakage state, such as the position of the fluid leakage source, the leakage direction, and the leakage amount, are output.

Based on the distributions of the values of detection target amounts acquired by the actual measured value acquirer 21 or the fluid leakage state judged by the leakage state judgement unit 22, the influence range determination unit 23 identifies a segment of the building in which the fluid leakage source is positioned. When it is speculated that the influence of the leaked fluid will go beyond the segment of the leakage source, the influence range determination unit 23 determines whether or not there will be an influence, such as diffusion of the leaked fluid, or ignition, a fire, or explosion caused by the leaked fluid, and also determines the range of the influence. The influence range determination unit 23 may determine the influence range in accordance with rule-based determination criteria based on the distributions of the values of detection target amounts and the leakage state, for example. In the present embodiment, the influence range is determined using the influence range determination algorithm 32 learned by the learning device 40. In the influence range determination algorithm 32, the values of detection target amounts detected by the multiple sensors 5, the parameters representing the leakage state judged by the leakage state judgement unit 22, and the like are input, and a parameter representing the influence range of the fluid leakage is output.

Based on the distributions of the values of detection target amounts acquired by the actual measured value acquirer 21, the fluid leakage state judged by the leakage state judgement unit 22, or the influence range of the fluid leakage determined by the influence range determination unit 23, the response action determination unit 24 determines a response action, such as controlling the leakage source or the ignition source, controlling fire extinguishing equipment, controlling emergent closing of a fluid valve, or depressurizing control, and also determines the range of the response action. The response action determination unit 24 may determine the response action and the range of the response action in accordance with rule-based determination criteria based on the distributions of the values of detection target amounts, the leakage state, and the influence range. In the present embodiment, the response action and the range of the response action are determined using the response action determination algorithm 33 learned by the learning device 40. In the response action determination algorithm 33, the values of detection target amounts detected by the multiple sensors 5, the parameters representing the leakage state judged by the leakage state judgement unit 22, the parameter representing the influence range determined by the influence range determination unit 23, and the like are input, and parameters representing a response action and the range of the response action are output.

The presentation unit 25 displays, on the display device 12, the fluid leakage state judged by the leakage state judgement unit 22, the influence range of the fluid leakage determined by the influence range determination unit 23, the response action and the range of the response action determined by the response action determination unit 24, and the like.

Figure 3:
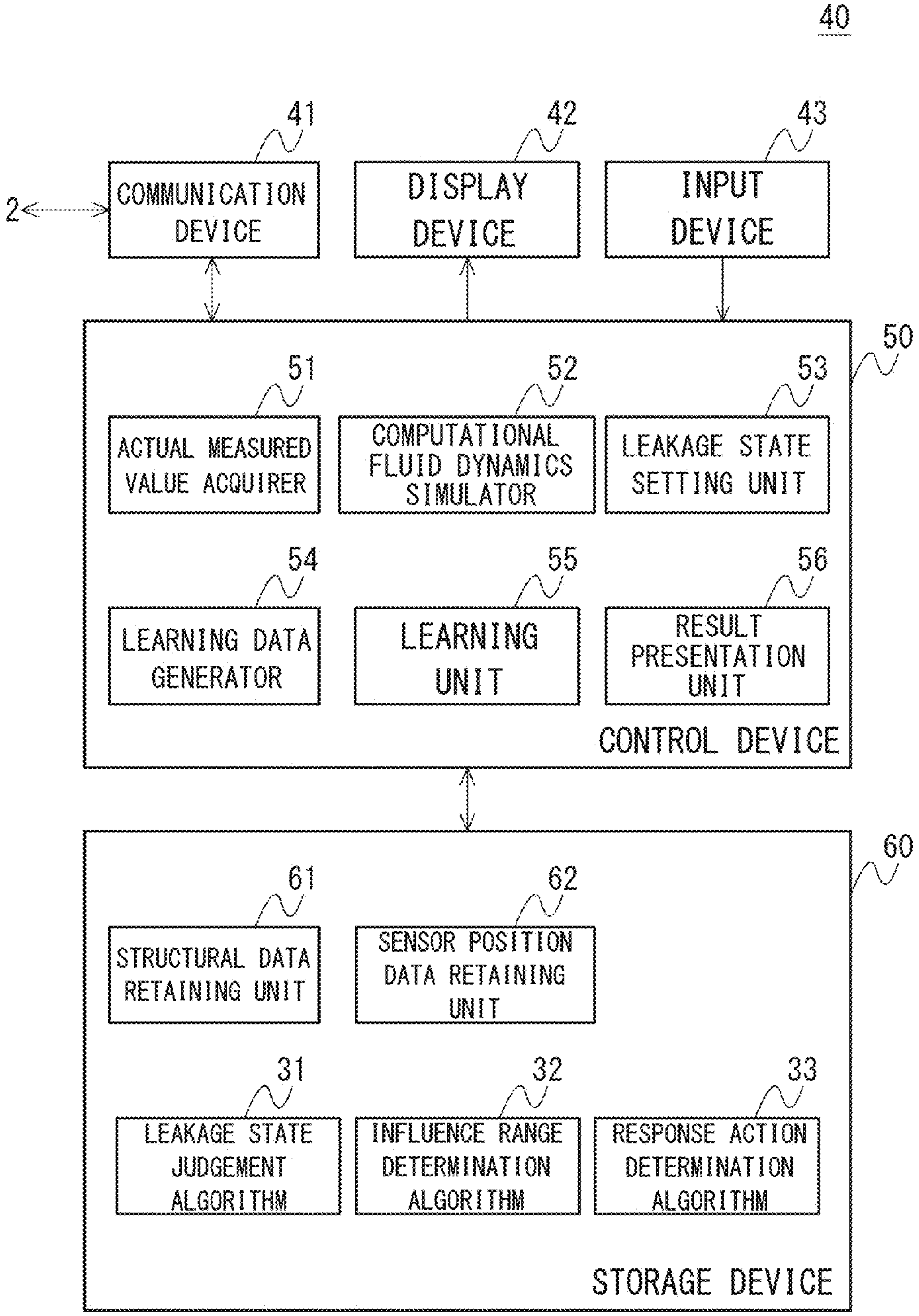
FIG. 3 is a diagram that illustrates a configuration of a learning device according to the first embodiment.

FIG. 3 illustrates a configuration of the learning device according to the first embodiment. The learning device 40 includes a communication device 41, a display device 42, an input device 43, a control device 50, and a storage device 60.

The communication device 41 controls wireless or wired communication. The communication device 41 transmits or receives data to or from the sensors 5 and the fluid leakage detection device 10, for example, via the Internet 2. The display device 42 displays a display image generated by the control device 50. The input device 43 inputs an instruction to the control device 50.

The storage device 60 stores data and computer programs used by the control device 50. The storage device 60 includes a structural data retaining unit 61, a sensor position data retaining unit 62, the leakage state judgement algorithm 31, the influence range determination algorithm 32, and the response action determination algorithm 33.

The structural data retaining unit 61 retains structural data that represent the structure of the plant 3. The sensor position data retaining unit 62 retains data that represent positions of multiple virtual sensors virtually provided in a plant represented by the structural data retained in the structural data retaining unit 61. The multiple virtual sensors are virtually provided at positions same as the installation positions of the multiple sensors 5 actually provided in the plant 3.

The control device 50 includes an actual measured value acquirer 51, a computational fluid dynamics simulator 52, a leakage state setting unit 53, a learning data generator 54, a learning unit 55, and a result presentation unit 56. These functional blocks may also be implemented in a variety of forms by hardware only, software only, or a combination thereof.

The actual measured value acquirer 51 acquires the values of detection target amounts detected by the multiple sensors 5 at the time when gas leakage occurs in the plant 3, and the parameters representing the leakage state at the time, as learning data used for learning of the leakage state judgement algorithm 31, the influence range determination algorithm 32, and the response action determination algorithm 33. However, leakage of gas or other fluids scarcely occurs in the actual plant 3 and it is difficult to conduct experiments in the plant 3 to obtain a gas leakage state, so that there are a very few actual measured values that can be used as learning data. Accordingly, in the present embodiment, fluid leakage states under various conditions in the plant 3 are reproduced by means of the computational fluid dynamics simulator 52 to generate learning data.

The computational fluid dynamics simulator 52 simulates behavior of a fluid leaked in a building, using the structural data of the building retained in the structural data retaining unit 61. For example, the structural data retaining unit 61 may divide the building into multiple computational grids and retain structural data, such as the coordinates of the center point, the volume, the range, and the degree of density, for each computational grid. The degree of density is a ratio of a length or the volume of a construct included in a computational grid to the volume of the computational grid. The shape of each computational grid may be a rectangular parallelepiped, may be a regular tetrahedron, or may be any other arbitrary shape. The structural data retaining unit 61 may retain three-dimensional shape data that represent a three-dimensional shape of the building, or may retain an arbitrary format of structural data that can be used in the computational fluid dynamics simulator 52. The structural data retaining unit 61 may also retain the shapes, the arranged positions, and the number of devices, pipes, and frames installed in the plant 3, for example. The computational fluid dynamics simulator 52 obtains, at predetermined time intervals, an approximate solution of a flow equation for each computational grid in a leakage state set by the leakage state setting unit 53, and computes the pressure, flow rate, density, and the like of the fluid in each computational grid. The computational fluid dynamics simulator 52 then simulates behavior of the fluid from the start of fluid leakage until a predetermined period of time elapses. Accordingly, assuming the case where a fluid leaks from a device or a pipe that contains a flammable gas or a toxic gas, a state of interference between the fluid and various constructs installed in the building and a state of diffusion of the fluid can be precisely reproduced.

The leakage state setting unit 53 sets a fluid leakage state to be simulated by the computational fluid dynamics simulator 52. The leakage state setting unit 53 sets parameters representing a leakage state, such as the position of the leakage source, the area and shape of the aperture, the type, composition, and temperature of the leaked material, and the direction, speed, amount, and duration of the leakage. The leakage state setting unit 53 also sets environmental conditions, including: parameters representing wind conditions, such as the wind speed, wind direction, and airflow turbulence; parameters representing weather conditions, such as the air temperature, air pressure, humidity, weather, and atmospheric stability; and parameters representing the topographic features and ground surface conditions. By setting various leakage states that may be caused in the plant 3 and allowing the computational fluid dynamics simulator 52 to simulate the leakage behavior to generate learning data, the leakage state judgement algorithm 31, with which various leakage states can be precisely detected, can be learned. To improve the learning efficiency, the leakage state setting unit 53 may preferentially set a leakage state that is considered to be relatively more likely to occur in the plant 3 and a leakage state that is considered to be highly dangerous and serious when it occurs, and such leakage states may be preferentially learned.

The result presentation unit 56 displays, on the display device 42, the fluid leakage state simulated by the computational fluid dynamics simulator 52. For example, the result presentation unit 56 may display an animation of a fluid leaking from the leakage source and then diffusing. In this case, the result presentation unit 56 may set an arbitrary viewpoint position and an arbitrary line-of-sight direction and perform rendering of structural data retained in the structural data retaining unit 61, so as to generate an image of the plant 3. The result presentation unit 56 may then superimpose a fluid leakage state as a simulation result, on the image of the plant 3 thus generated. Also, the result presentation unit 56 may change a displayed color according to the concentration or the type of the fluid. This can also visualize the fluid behavior outside the detection ranges of the gas concentration sensor and the infrared camera.

The result presentation unit 56 may also display a gas concentration distribution on an arbitrary two-dimensional cross section. The result presentation unit 56 may display an image of a gas cloud viewed from an arbitrary viewpoint position in an arbitrary line-of-sight direction. The result presentation unit 56 may compute an integral value based on the gas concentration and the length of the gas cloud on each optical path viewed from a viewpoint position in a line-of-sight direction, and may display the integral value thus computed on an arbitrary two-dimensional cross section.

Based on the simulation results provided from the computational fluid dynamics simulator 52, the learning data generator 54 generates learning data used for learning of the leakage state judgement algorithm 31, the influence range determination algorithm 32, and the response action determination algorithm 33. The learning data generator 54 may generate learning data of values of gas concentration detected by the gas concentration sensor, or may generate learning data of pixel values of images capture by the infrared camera.

When a gas concentration sensor is provided as a sensor 5 in the plant 3, the learning data generator 54 computes a time variation of the value of gas concentration presumed to be detected by each of multiple virtual gas concentration sensors located at installation positions retained in the sensor position data retaining unit 62, and generates, as learning data, a set of the computed values and the parameters representing the leakage state.

When an infrared camera is provided as a sensor 5 in the plant 3, the learning data generator 54 computes a time variation of a pixel value of an image presumed to be captured by each of multiple virtual infrared cameras located at installation positions retained in the sensor position data retaining unit 62, and generates, as learning data, a set of the computed values and the parameters representing the leakage state. In this case, the learning data generator 54 may compute, as the pixel value, an integral value based on the gas concentration and the length of the gas cloud on each optical path viewed from the installation position of an infrared camera in the line-of-sight direction of the infrared camera.

Figure 4A:
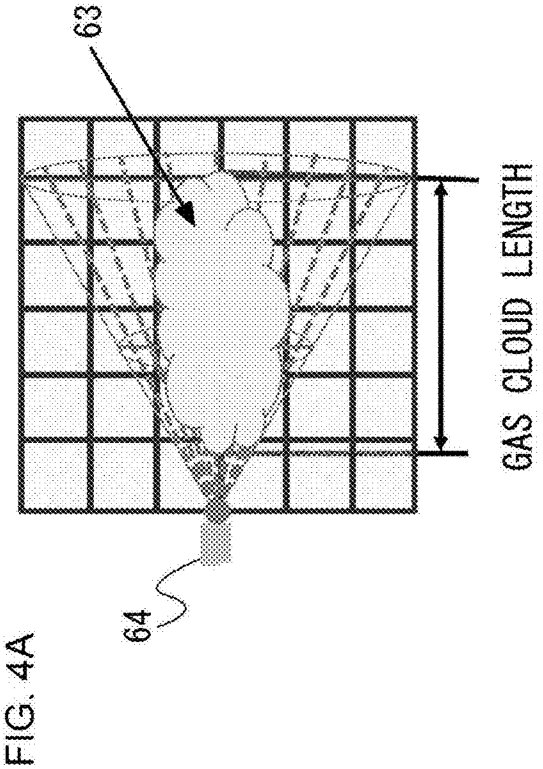
FIG. 4A to FIG. 4D are diagrams that illustrate examples of learning data generated by a learning data generator.
Figure 4B:
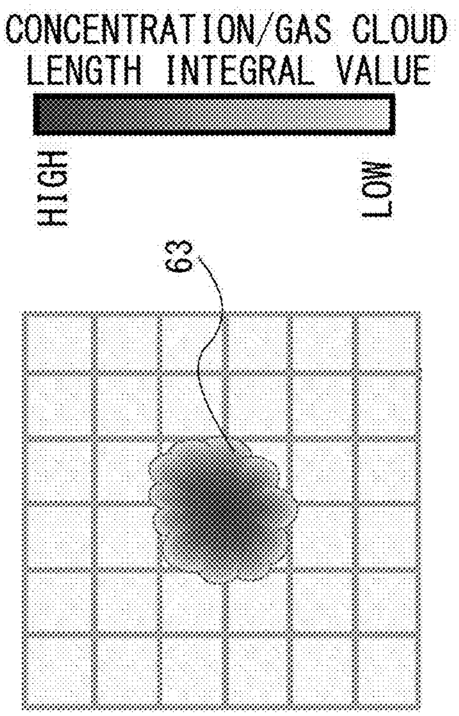
Figure 4C:
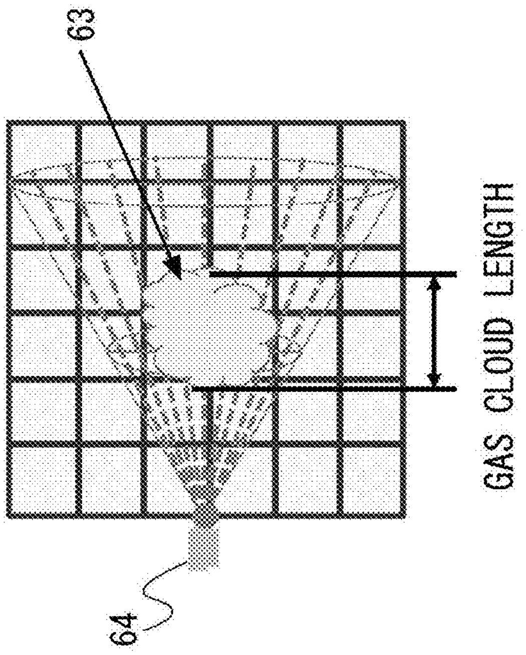
Figure 4D:
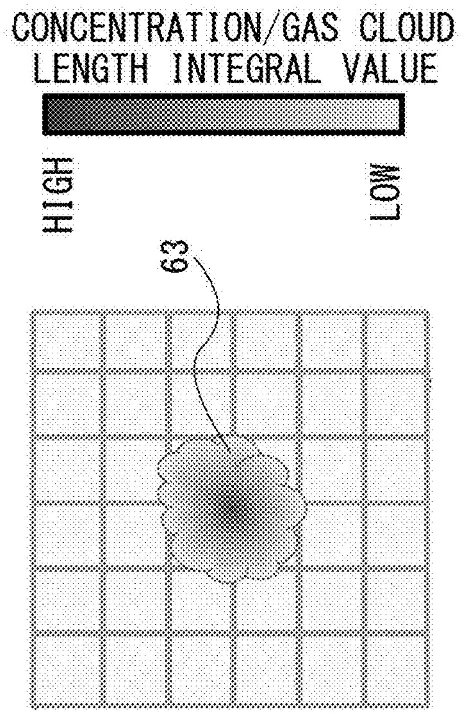

FIG. 4A to FIG. 4D illustrate examples of learning data generated by the learning data generator 54. FIG. 4A and FIG. 4C illustrate simulation results provided from the computational fluid dynamics simulator 52. The leaked gas diffuses to form a gas cloud 63. The learning data generator 54 sets the viewpoint position and the line-of-sight direction of a virtual infrared camera 64 and computes an integral value based on the gas concentration and the length of the gas cloud on each optical path viewed from the viewpoint position in the line-of-sight direction, so as to generate an image presumed to be captured by an infrared camera installed at the viewpoint position. FIG. 4B and FIG. 4D are images generated by the learning data generator 54. The gas cloud 63 is captured in each image, but, since the gas cloud 63 in FIG. 4A diffuses longer in the line-of-sight direction of the virtual infrared camera 64 than the gas cloud 63 in FIG. 4C, the gas cloud 63 in the image of FIG. 4B is more deeply colored than the gas cloud 63 in the image of FIG. 4D. The learning data generator 54 sets the viewpoint position of the virtual infrared camera 64 to multiple installation positions retained in the sensor position data retaining unit 62 to generate a great number of such images, and combines the images with the parameters representing the leakage states, so as to generate learning data. Accordingly, relationships between the images captured by the infrared camera and the parameters representing the leakage states can be learned.

Instead of or in addition to the gas concentration or a pixel value of the infrared image at the position of each sensor, the learning data generator 54 may use another parameter related to the leaked gas to generate learning data. For example, learning data may be generated using a gas concentration distribution on an arbitrary two-dimensional cross section that traverses a gas cloud, the size of the gas cloud, a spatial differential value or a time differential value of the gas concentration or the pixel value, a wind speed distribution or a wind direction distribution, or a value or a distribution of equivalent stoichiometric gas concentration. In this case, each of the leakage state judgement algorithm 31, the influence range determination algorithm 32, and the response action determination algorithm 33 may be a neural network in which such values are input to the input layer thereof. The fluid leakage detection device 10 may compute such values based on the values of detection target amounts acquired by the actual measured value acquirer 21 and input the computed values to the leakage state judgement algorithm 31, the influence range determination algorithm 32, and the response action determination algorithm 33.

To generate learning data used for learning of the influence range determination algorithm 32, the learning data generator 54 may compute ignition possibility based on the concentration and temperature of a flammable gas, for example, and may define, as the influence range, a range in which the ignition possibility is a predetermined value or greater. Also, the concentration of a toxic gas may be compared to the maximum allowable limit thereof, so that a range in which the concentration of the toxic gas exceeds the maximum allowable limit may be defined as the influence range. To evaluate the dangerousness of various fluids in a unified manner, the gas concentration may be corrected using a burning characteristic, such as the laminar burning velocity based on the gas concentration at each point in a gas cloud, and the corrected value may be integrated over the entire gas cloud to compute an integral value.

To generate learning data used for learning of the response action determination algorithm 33, the learning data generator 54 may allow the computational fluid dynamics simulator 52 to further simulate a fluid leakage state that may be seen when a predetermined response action is performed, and whether or not the response action is appropriate may be judged based on the simulation result. For example, a fluid diffusion state in the case where a fire door is closed at predetermined timing may be simulated by the computational fluid dynamics simulator 52, and the subsequent fluid diffusion states may be compared to the fluid diffusion states in the case where the fire door is not closed, so as to judge whether or not the response action of closing the fire door at the predetermined timing is appropriate. The simulation result provided from the computational fluid dynamics simulator 52 may be presented from the result presentation unit 56 to an operator, and a response action or whether or not the response action is appropriate may be acquired from the operator via the input device 43.

The learning unit 55 uses, as teacher data, actual measured values acquired by the actual measured value acquirer 51 or learning data generated by the learning data generator 54 to learn the leakage state judgement algorithm 31, the influence range determination algorithm 32, and the response action determination algorithm 33 by supervised deep learning. The learning unit 55 adjusts weights of an intermediate layer in the neural network based on the input data and the output data included in the teacher data to learn the leakage state judgement algorithm 31, the influence range determination algorithm 32, and the response action determination algorithm 33. The leakage state judgement algorithm 31, the influence range determination algorithm 32, and the response action determination algorithm 33 thus learned are provided to the fluid leakage detection device 10.

The learning unit 55 may learn the response action determination algorithm 33 by reinforcement learning. In this case, the learning unit 55 may allow the computational fluid dynamics simulator 52 to simulate fluid leakage states that may be seen when various response actions are performed at various times, and may learn the response action determination algorithm 33 by reinforcement learning in which the fluid leakage amount, leakage range, or influence range becoming smaller than that in the case where the response action is not performed may be set as a reward.

When fluid leakage is detected, the fluid leakage detection device 10 may display the fluid leakage behavior on the display device 12. On the display device 12, the fluid leakage detection device 10 may display the fluid leakage behavior from the start of the leakage to the current time, or may display predicted future fluid leakage behavior. In this case, the fluid leakage detection device 10 may acquire a moving image showing the fluid leakage behavior from the learning device 40 and display the moving image, or may include a configuration for generating a moving image showing fluid leakage behavior. In the latter case, the fluid leakage detection device 10 may include the structural data retaining unit 61, the computational fluid dynamics simulator 52, and the leakage state setting unit 53. Accordingly, even when fluid leakage occurs in the plant 3, the fluid leakage behavior can be visually and clearly presented to the operator, thereby helping the operator to determine an appropriate response action.

Instead of the leakage state judgement algorithm 31, the leakage state judgement unit 22 of the fluid leakage detection device 10 may refer to a leakage state database that stores a number of sets of a gas concentration distribution or an image captured by the infrared camera and the parameters representing a leakage state, so as to judge a leakage state. In this case, the leakage state judgement unit 22 may search the leakage state database for a gas concentration distribution or an image captured by the infrared camera that matches or is similar to the distribution of the value of the corresponding detection target amount acquired by the actual measured value acquirer 21, so as to judge a leakage state. At the time, the leakage state judgement unit 22 may search the leakage state database using an image matching technology or the like.

Second Embodiment

After a great number of simulation results regarding fluid leakage behavior generated by the computational fluid dynamics simulator 52 as described previously are analyzed, a correlation between a factor of plant structure or the like and dangerousness related to fluid leakage may be extracted, which can be utilized for designing and improvement of plants.

Figure 5:
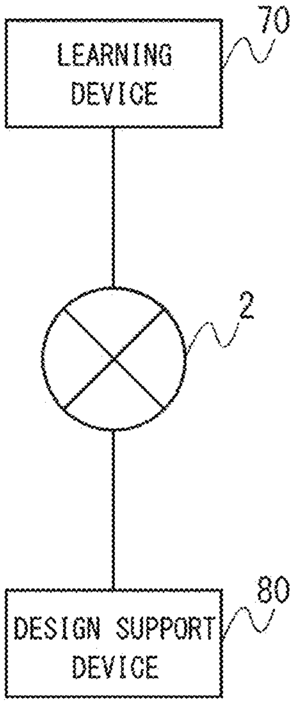
FIG. 5 is a diagram that illustrates an overall configuration of a design support system according to a second embodiment.

FIG. 5 illustrates an overall configuration of a design support system according to the second embodiment. A design support system 6 includes a learning device 70 that learns a dangerousness judgement algorithm used to judge dangerousness related to fluid leakage based on a factor of plant structure or the like, and a design support device 80 that supports designing of a plant using the dangerousness judgement algorithm learned by the learning device 70. The learning device 70 and the design support device 80 are connected via the Internet 2.

Figure 6:
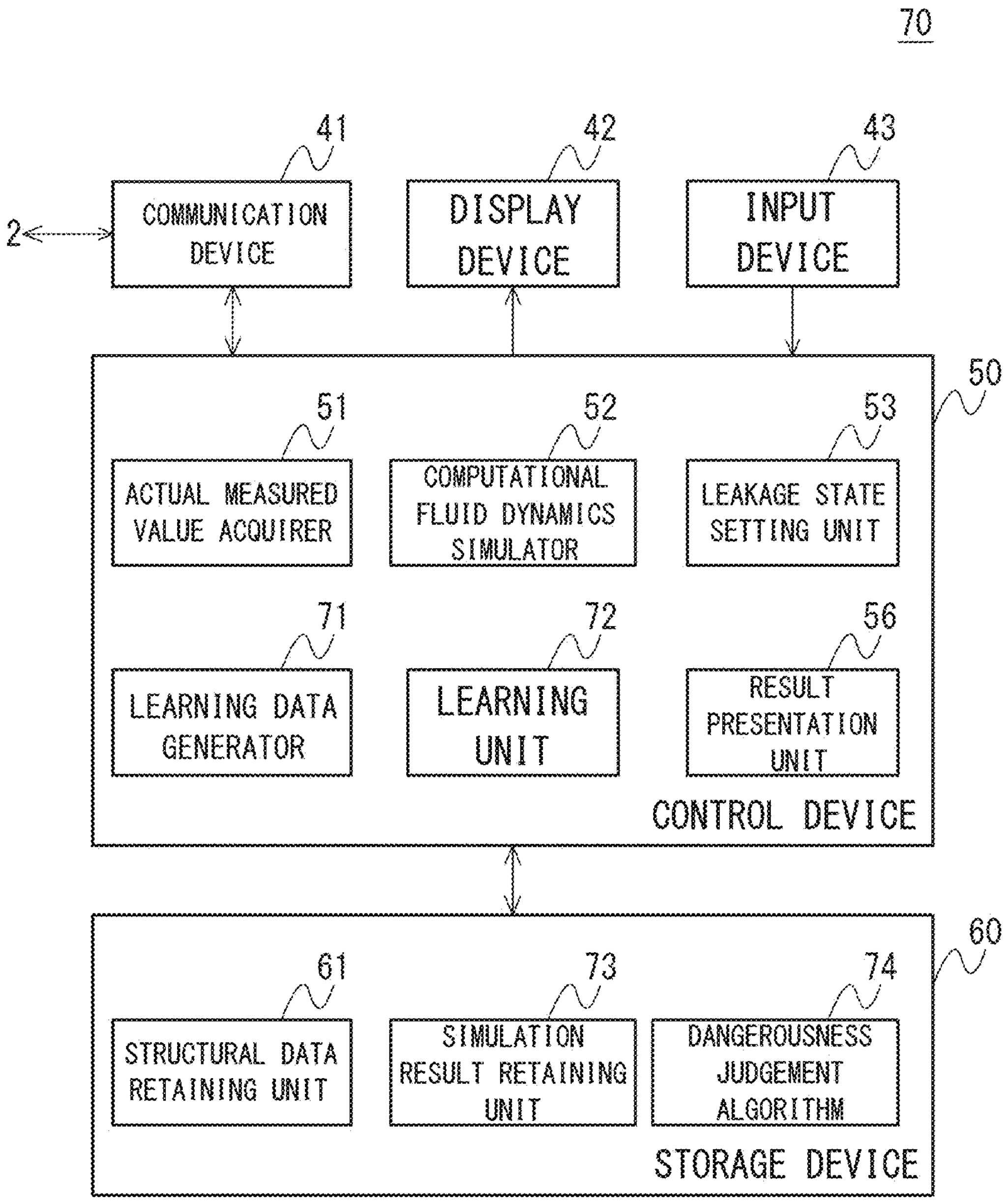
FIG. 6 is a diagram that illustrates a configuration of a learning device according to the second embodiment.

FIG. 6 illustrates a configuration of the learning device according to the second embodiment. The learning device 70 includes a learning data generator 71 and a learning unit 72, instead of the learning data generator 54 and the learning unit 55 of the learning device 40 according to the first embodiment illustrated in FIG. 3. Also, the learning device 70 includes a simulation result retaining unit 73 and a dangerousness judgement algorithm 74, instead of the sensor position data retaining unit 62, the leakage state judgement algorithm 31, the influence range determination algorithm 32, and the response action determination algorithm 33. Other configurations and operations are the same as those described in the first embodiment.

The simulation result retaining unit 73 retains simulation results provided from the computational fluid dynamics simulator 52. The simulation result retaining unit 73 may retain simulation results based on the structure of a plant of which designing is to be supported, or may retain simulation results based on the structures of multiple plants. Based on the simulation results retained in the simulation result retaining unit 73, the learning data generator 71 evaluates the dangerousness related to fluid leakage in accordance with a predetermined criterion, and generates learning data used for learning of a correlation between evaluated dangerousness and a factor of plant structure or the like in the simulation. The learning data generator 71 may evaluate the dangerousness based on: a gas concentration distribution on an arbitrary two-dimensional cross section that traverses the gas cloud; the size of the gas cloud; a spatial differential value or a time differential value of the gas concentration or the pixel value; a value or a distribution of equivalent stoichiometric gas concentration; the concentration and temperature of a flammable gas and the ignition possibility; the concentration of a toxic gas; an integral value obtained by integrating, over the entire gas cloud, a value obtained by correcting the gas concentration using a burning characteristic, such as the laminar burning velocity based on the gas concentration at each point in the gas cloud; and the influence range of the leaked fluid, for example. A factor of structure or the like may be the type or material of an installed construct, a physical quantity of the construct, such as the area, volume, density, or operating temperature, the degree of density, or the type, amount, or temperature of a fluid that the construct may contain, for example.

The learning unit 72 uses the learning data generated by the learning data generator 71 to learn the dangerousness judgement algorithm 74. The dangerousness judgement algorithm 74 may be a neural network to which values of multiple factors extractable from the structural data of the plant or the like are input and from which the dangerousness related to fluid leakage is output, may be a mathematical formula for representing the dangerousness in which the values of multiple factors are set as variables, or may be an arbitrary form of algorithm with which dangerousness can be judged from the values of multiple factors, for example. The learning unit 72 may learn the dangerousness judgement algorithm 74 using arbitrary technologies, such as data mining, logistic regression analysis, multivariate analysis, unsupervised machine learning, and supervised machine learning. For example, an intermediate layer in the neural network may be adjusted such that, when the values of multiple factors are input, evaluated dangerousness is output for each simulation result. Also, by logistic regression analysis, a regression coefficient in a regression equation may be computed.

Figure 7:
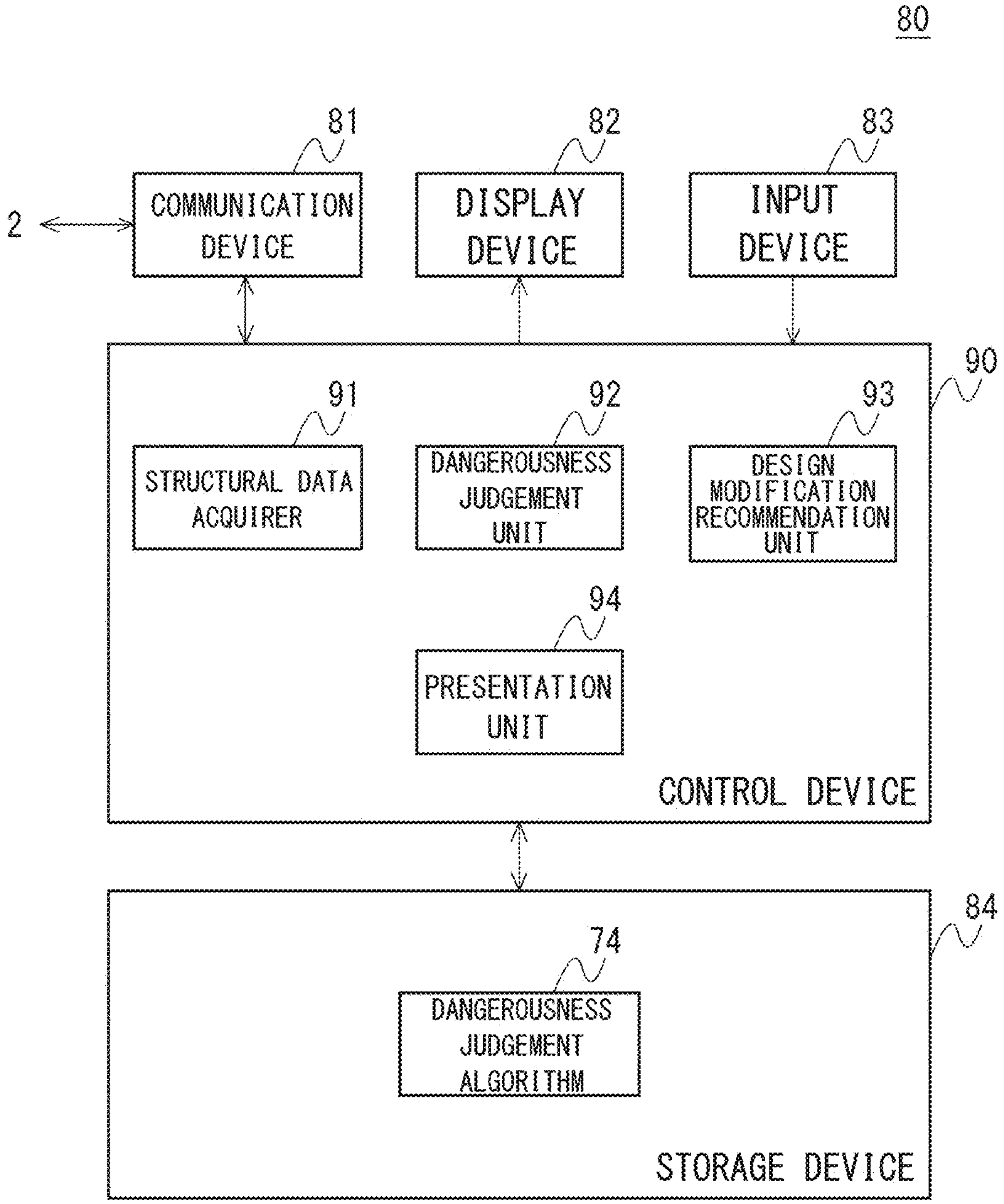
FIG. 7 is a diagram that illustrates a configuration of a design support device according to the second embodiment.

FIG. 7 illustrates a configuration of the design support device according to the second embodiment. The design support device 80 according to the second embodiment includes a communication device 81, a display device 82, an input device 83, a control device 90, and a storage device 84.

The communication device 81 controls wireless or wired communication. The communication device 81 transmits or receives data to or from the learning device 70 or the like via the Internet 2. The display device 82 displays a display image generated by the control device 90. The input device 83 inputs an instruction to the control device 90.

The storage device 84 stores data and computer programs used by the control device 90. The storage device 84 includes the dangerousness judgement algorithm 74.

The control device 90 includes a structural data acquirer 91, a dangerousness judgement unit 92, a design modification recommendation unit 93, and a presentation unit 94. These configurations may also be implemented in a variety of forms by hardware only, software only, or a combination thereof.

The structural data acquirer 91 acquires structural data that represent the structure of a plant. The structural data acquirer 91 may acquire CAD data or the like of a plant under design, or may acquire CAD data or three-dimensional image data of a constructed plant, for example.

Based on the structural data acquired by the structural data acquirer 91, the dangerousness judgement unit 92 judges the dangerousness of the plant using the dangerousness judgement algorithm 74. The dangerousness judgement unit 92 computes values of factors to be input to the dangerousness judgement algorithm 74 based on the structural data, and inputs the values of factors thus computed to the dangerousness judgement algorithm 74 to judge the dangerousness. The dangerousness judgement unit 92 may divide the plant into multiple regions and judge the dangerousness for each region.

When the dangerousness judged by the dangerousness judgement unit 92 matches a predetermined condition, the design modification recommendation unit 93 recommends a design modification of the plant. The design modification recommendation unit 93 may recommend a design modification of the plant when the dangerousness is higher than a predetermined value. When the dangerousness judgement unit 92 judges the dangerousness for each region, the design modification recommendation unit 93 may recommend a design modification for each region. The design modification recommendation unit 93 may also recommend providing a sensor 5 in a region of which the dangerousness is higher than the predetermined value, changing the arrangement of constructs such as to reduce the degree of density of a region of which the dangerousness is higher than the predetermined value, and installing a construct to prevent fluid diffusion in a region of which the dangerousness is higher than the predetermined value.

The presentation unit 94 displays, on the display device 82, the judgement result provided from the dangerousness judgement unit 92, recommendation of a design modification provided from the design modification recommendation unit 93, and the like. The presentation unit 94 may set an arbitrary viewpoint position and an arbitrary line-of-sight direction and perform rendering of structural data acquired by the structural data acquirer 91, so as to generate an image of the plant. The presentation unit 94 may then superimpose the dangerousness on the image of the plant thus generated. Also, the presentation unit 94 may change a displayed color according to the degree of the dangerousness. This can visualize the dangerousness of the plant, thereby appropriately supporting the analysis, evaluation, and designing regarding a layout of a plant for disaster mitigation, arrangement of sensors, danger scenarios, and the degree of influence, for example.

The present invention has been described with reference to embodiments. The embodiments are intended to be illustrative only, and it will be obvious to those skilled in the art that various modifications to a combination of constituting elements or processes could be developed and that such modifications also fall within the scope of the present invention.

A fluid leakage detection system according to one aspect of the present invention includes: multiple sensors, provided in a building, that respectively detect values of detection target amounts at the installation positions thereof; and a fluid leakage detection device that detects leakage of a fluid in the building based on the values of detection target amounts detected by the multiple sensors. The fluid leakage detection device includes: an actual measured value acquirer that acquires the values of detection target amounts detected by the multiple sensors; and a leakage state judgement unit that judges a leakage state of the fluid in the building based on distributions of the values of detection target amounts acquired by the actual measured value acquirer. According to this aspect, a fluid leakage state in a building can be precisely detected.

The leakage state judgement unit may judge the leakage state of the fluid by means of a leakage state judgement algorithm learned by machine learning, to which the values of detection target amounts detected by the multiple sensors are input and from which the leakage state of the fluid is output. According to this aspect, the accuracy of detection of a fluid leakage state can be improved.

The fluid leakage detection system may further include a learning device that learns the leakage state judgement algorithm. The learning device may include a learning unit that learns the leakage state judgement algorithm by machine learning using, as learning data, the values of detection target amounts detected respectively by the multiple sensors at the time of leakage of the fluid from a predetermined position of the building. According to this aspect, the accuracy of the leakage state judgement algorithm can be improved.

The learning device may further include: a structural data retaining unit that retains structural data of the building; and a three-dimensional flow simulator that simulates behavior of the fluid in the building at the time of leakage of the fluid from a predetermined position of the building, by performing three-dimensional flow simulation based on structural data of the building retained in the structural data retaining unit. The learning unit may learn the leakage state judgement algorithm by machine learning using, as learning data, the values of detection target amounts computed based on a result of three-dimensional flow simulation performed by the three-dimensional flow simulator. According to this aspect, even in the case where there are few actual measured values, a great amount of learning data can be generated and learned, so that the accuracy of the leakage state judgement algorithm and the learning efficiency can be improved.

The learning device may further include: a sensor position data retaining unit that retains data representing installation positions of the multiple sensors; and a learning data generator that generates the learning data by computing the values of detection target amounts presumed to be detected respectively by the multiple sensors located at installation positions retained in the sensor position data retaining unit, based on a result of three-dimensional flow simulation performed by the three-dimensional flow simulator. The learning unit may learn the leakage state judgement algorithm by machine learning using learning data generated by the learning data generator. According to this aspect, the accuracy of the leakage state judgement algorithm can be improved.

The learning unit may learn the leakage state judgement algorithm by machine learning using, as learning data, the values of detection target amounts computed based on multiple simulations in which at least one of the position of the leakage source of the fluid, the type of the fluid, the composition of multiple substances constituting the fluid, the leakage amount of the fluid, the leakage direction of the fluid, or a physical quantity representing a state of the building or environment computed by the three-dimensional flow simulator is different. According to this aspect, the accuracy of the leakage state judgement algorithm can be improved.

The sensors may include a fluid concentration sensor that detects concentration of the fluid.

The sensors may include an infrared camera.

Another aspect of the present invention is a fluid leakage detection device. The device includes: an actual measured value acquirer that acquires values of detection target amounts detected by multiple sensors, provided in a building, that respectively detect values of detection target amounts at the installation positions thereof; and a leakage state judgement unit that judges a leakage state of the fluid in the building based on distributions of the values of detection target amounts acquired by the actual measured value acquirer. According to this aspect, a fluid leakage state in a building can be precisely detected.

Yet another aspect of the present invention is a learning device. The device includes: a learning data acquirer that acquires, as learning data, values of detection target amounts detected, at the time of leakage of a fluid from a predetermined position of a building, respectively by multiple sensors provided in the building; and a learning unit that learns a leakage state judgement algorithm to which the values of detection target amounts detected by the multiple sensors are input and from which a position of a leakage source of the fluid is output, by machine learning using learning data acquired by the learning data acquirer. According to this aspect, the accuracy of the leakage state judgement algorithm can be improved.

INDUSTRIAL APPLICABILITY

The present invention is applicable to fluid leakage detection systems for detecting fluid leakage in buildings.

What is claimed is:

1. A fluid leakage detection system, comprising:
  a plurality of sensors, provided in a building, that respectively detect values of detection target amounts at the installation positions thereof;
  a memory that retains structural data of the building divided into a plurality of computational grids;
  a central processing unit (CPU) configured to:
  detect leakage of a fluid in the building by means of a neural network used to judge a leakage state of the fluid in the building, based on distributions of the values of detection target amounts detected by the plurality of sensors;
  learn the neural network,
  acquire the values of detection target amounts detected by the plurality of sensors; and
  judge a leakage state of the fluid in the building by means of the neural network, based on distributions of the values of detection target amounts acquired,
  simulate behavior of the fluid in the building at the time of leakage of the fluid from a predetermined position of the building, by performing three-dimensional flow simulation by setting the leakage state at the time of leakage of the fluid from the predetermined position of the building represented by the structural data retained in the memory, obtaining an approximate solution of a flow equation for each computational grid in the leakage state set at predetermined time intervals, computing a pressure, a flow rate, or a density of the fluid in each computational grid, and
  learn the neural network by supervised machine learning using, as training data, both the distributions of the values of detection target amounts detected respectively by the plurality of sensors at the time of leakage of the fluid from the predetermined position of the building and distributions of the values of detection target amounts computed based on a result of computational fluid dynamics simulation,
  wherein the leakage state includes at least one of a position of a leakage source, an area and shape of an aperture, a type, composition, and temperature of a leaked material, and a direction, speed, amount, and duration of the leakage, and
  the CPU generates learning data by allowing the CPU to further simulate the leakage state of the fluid in the case where a predetermined response action is performed and comparing the simulation result and a simulation result in the case where the predetermined response action is not performed to judge whether or not the predetermined response action is appropriate.

2. The fluid leakage detection system according to claim 1, wherein
  inside the building, a construct is provided, and
  the CPU simulates behavior of the fluid that diffuses while interfering with the construct.

3. The fluid leakage detection system according to claim 1, wherein the CPU is further configured to:
  retain data representing installation positions of the plurality of sensors; and
  generate the training data by computing the distributions of the values of detection target amounts presumed to be detected respectively by the plurality of sensors located at installation positions retained in the CPU, based on a result of the three-dimensional flow simulation performed by the CPU, and wherein
  the CPU learns the neural network by the supervised machine learning using the training data generated by the CPU.

4. The fluid leakage detection system according to claim 1, wherein the CPU learns the neural network by the supervised machine learning using, as the training data, the distributions of the values of detection target amounts computed based on a plurality of simulations in which at least one of the position of the leakage source of the fluid, the type of the fluid, the composition of a plurality of substances constituting the fluid, the leakage amount of the fluid, the leakage direction of the fluid, or a physical quantity representing a state of the building or environment computed by the CPU is different.

5. The fluid leakage detection system according to claim 1, wherein the CPU is further configured to:
  use an influence range determination algorithm to which the values of detection target amounts detected by the plurality of sensors are input and from which whether or not there is an influence caused by a leaked fluid or a range of the influence is output, and determine whether or not there is an influence or a range of the influence based on the values of detection target amounts acquired by the CPU, and wherein the CPU learns the influence range determination algorithm by machine learning using, as learning data, the values of detection target amounts computed based on a result of the three-dimensional flow simulation performed by the CPU.

6. The fluid leakage detection system according to claim 1, wherein the CPU is further configured to:

use a response action determination algorithm to which the values of detection target amounts detected by the plurality of sensors are input and from which a response action for leakage of the fluid or a range of the response action is output, and determine a response action or a range of the response action based on the values of detection target amounts acquired by the CPU, and wherein the CPU learns the response action determination algorithm by machine learning using, as learning data, the values of detection target amounts computed based on a result of the three-dimensional flow simulation performed by the CPU.

7. The fluid leakage detection system according to claim 6, wherein the CPU learns the response action determination algorithm by reinforcement learning in which a leakage amount, a leakage range, or an influence range of the fluid becoming smaller than that in the case where the response action is not performed is set as a reward.

8. The fluid leakage detection system according to claim 7, wherein the CPU generates the learning data by allowing the CPU to further simulate the leakage state of the fluid in the case where a plurality of different response actions are performed at a plurality of times.

9. The fluid leakage detection system according to claim 1, wherein the plurality of sensors include a fluid concentration sensor that detects a concentration of the fluid.

10. The fluid leakage detection system according to claim 1, wherein the plurality of sensors include an infrared camera.

11. A learning system, comprising:

a memory that retains structural data of a building divided into a plurality of computational grids;

a central processing unit (CPU) configured to:

learn a neural network; and simulate behavior of a fluid in the building at the time of leakage of the fluid from a predetermined position of the building, by performing three-dimensional flow simulation by setting a leakage state at the time of leakage of the fluid from the predetermined position of the building represented by the structural data retained in the memory, obtaining an approximate solution of a flow equation for each computational grid in the leakage state set at predetermined time intervals, computing a pressure, a flow rate, or a density of the fluid in each computational grid; wherein the CPU learns the neural network by supervised machine learning using, as training data, both the distributions of the values of detection target amounts detected respectively by a plurality of sensors at the time of leakage of the fluid from the predetermined position of the building and distributions of the values of detection target amounts computed based on a result of three-dimensional flow simulation performed by the CPU, and the CPU generates learning data by allowing the CPU to further simulate the leakage state of the fluid in the case where a predetermined response action is performed and comparing the simulation result and a simulation result in the case where the predetermined response action is not performed to judge whether or not the predetermined response action is appropriate.

12. A fluid leakage detection system, comprising:

the CPU configured to:

acquire values of the detection target amounts detected by the plurality of sensors, provided in the building, that respectively detect values of detection target amounts at the installation positions thereof; and judge the leakage state of the fluid in the building based on distributions of the values of detection target amounts acquired by the CPU, wherein the CPU judges the leakage state of the fluid in the building by means of the neural network learned by the learning device system according to claim 11.

* * * * *